United States Patent
Modrzejewski et al.

(10) Patent No.: US 9,964,184 B2
(45) Date of Patent: May 8, 2018

(54) VARIABLE SPEED AIRCRAFT TRANSMISSION

(71) Applicant: Bell Helicopter Textron Inc., Fort Worth, TX (US)

(72) Inventors: Brian Stanley Modrzejewski, Keller, TX (US); Russell Mueller, Dallas, TX (US); Doug Mueller, Coppell, TX (US); Ron Woods, Weatherford, TX (US); Tim Cecil, Fort Worth, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 480 days.

(21) Appl. No.: 14/683,218

(22) Filed: Apr. 10, 2015

(65) Prior Publication Data
US 2016/0076629 A1   Mar. 17, 2016

Related U.S. Application Data

(60) Provisional application No. 61/977,904, filed on Apr. 10, 2014.

(51) Int. Cl.
*F16H 3/48* (2006.01)
*F16H 3/10* (2006.01)
(Continued)

(52) U.S. Cl.
CPC .............. *F16H 3/58* (2013.01); *B64C 27/00* (2013.01); *B64C 29/0033* (2013.01);
(Continued)

(58) Field of Classification Search
CPC .............. F16H 3/58; F16H 2200/2066; F16H 2200/2079; F16H 2200/0034;
(Continued)

(56) References Cited

U.S. PATENT DOCUMENTS 2,339,269 A * 1/1944 James ................... F16H 3/58
475/324
6,419,606 B1 * 7/2002 Tengan ................ B64C 13/28
475/254
(Continued)

FOREIGN PATENT DOCUMENTS

DE         10146836 A1    4/2003
EP          2584220 A1    4/2013
JP       2013245736 A    12/2013

OTHER PUBLICATIONS

Office Action in related European Patent Application No. 15163258.5, dated Dec. 20, 2016, 8 pages.
(Continued)

*Primary Examiner* — Ramya Burgess
*Assistant Examiner* — Lillian Nguyen
(74) *Attorney, Agent, or Firm* — Lightfoot & Alford PLLC

(57) ABSTRACT

A variable state planetary shifting transmission can include an input shaft, an output shaft; and a planetary system having a sun gear associated with the input shaft, a planetary carrier, and a ring gear associated with a ring housing. The transmission can include an overrunning clutch operably coupled to the planetary carrier. The transmission can include a clutch assembly coupled to the planetary carrier. The transmission is capable of changing the speed ratio between the input shaft and the output shaft by selective engagement of the clutch assembly against the ring gear which can cause either the freeing or locking of the planetary carrier by the overrunning clutch.

16 Claims, 11 Drawing Sheets

(51) Int. Cl.
  *F16H 3/58* (2006.01)
  *B64C 27/00* (2006.01)
  *B64C 29/00* (2006.01)
  *B64D 35/00* (2006.01)
  *B64C 27/12* (2006.01)

(52) U.S. Cl.
  CPC ............... *B64D 35/00* (2013.01); *F16H 3/48* (2013.01); *B64C 27/12* (2013.01); *F16H 2200/0034* (2013.01); *F16H 2200/2005* (2013.01); *F16H 2200/2035* (2013.01); *F16H 2200/2066* (2013.01); *F16H 2200/2079* (2013.01)

(58) Field of Classification Search
  CPC ... F16H 2200/2005; F16H 3/48; B64D 35/00; B64C 27/00; B64C 27/12
  See application file for complete search history.

(56) References Cited

U.S. PATENT DOCUMENTS

| | | | |
|---|---|---|---|
| 6,537,169 B1* | 3/2003 | Morii | F16H 3/721 475/10 |
| 2010/0248884 A1 | 9/2010 | Tremblay | |
| 2014/0116652 A1* | 5/2014 | Ehinger | B64C 27/12 165/104.21 |
| 2015/0276020 A1* | 10/2015 | Yoon | F16H 3/005 475/12 |

OTHER PUBLICATIONS

Intent to Grant in related European Patent Application No. 15163258.5, dated Oct. 25, 2017, 34 pages.
European Search Report in related European Patent Application No. 15163258.5, dated Jul. 30, 2015, 3 pages.

* cited by examiner

VARIABLE SPEED AIRCRAFT TRANSMISSION

BACKGROUND

Technical Field:

The present disclosure relates to a variable speed transmission for a vehicle, such as an aircraft.

Description of Related Art:

Conventionally, aircraft such as helicopters, utilize a gearbox to reduce turbine engine speed and achieve the desired main rotor speed. It can be desirable to selectively operate an aircraft at lower main rotor speeds. Typically, a main rotor operated at lower speeds produces less noise. In one conventional method, the lower main rotor speed is achieved by operating the engine at a lower engine speed; however, conventional turbine engines operate most efficiently at just one speed. Moreover, reducing the engine speed can impact engine performance, such as fuel consumption.

Although great strides have been made in the field of aircraft gearboxes, there is a need for an improved variable speed gearbox.

DESCRIPTION OF THE DRAWINGS

The novel features believed characteristic of the apparatus of the present disclosure are set forth in the appended claims. However, the apparatus itself, as well as a preferred mode of use, and further objectives and advantages thereof, will best be understood by reference to the following detailed description when read in conjunction with the accompanying drawings, wherein:

DESCRIPTION OF THE PREFERRED EMBODIMENT

Illustrative embodiments of the apparatus of the present disclosure are described below. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
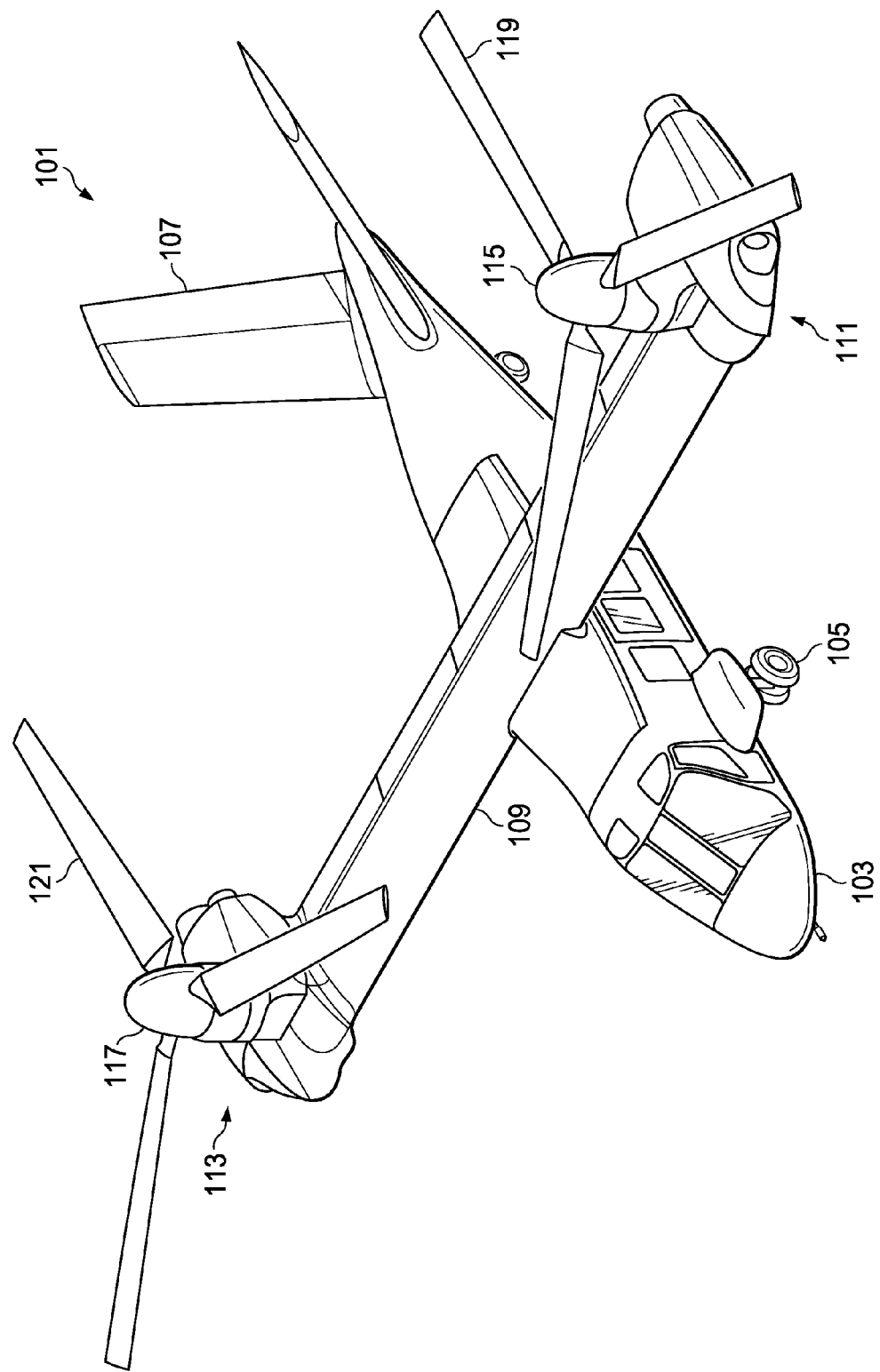
FIG. 1 is a tilt rotor aircraft in a helicopter mode, according to one example embodiment.
Figure 2:
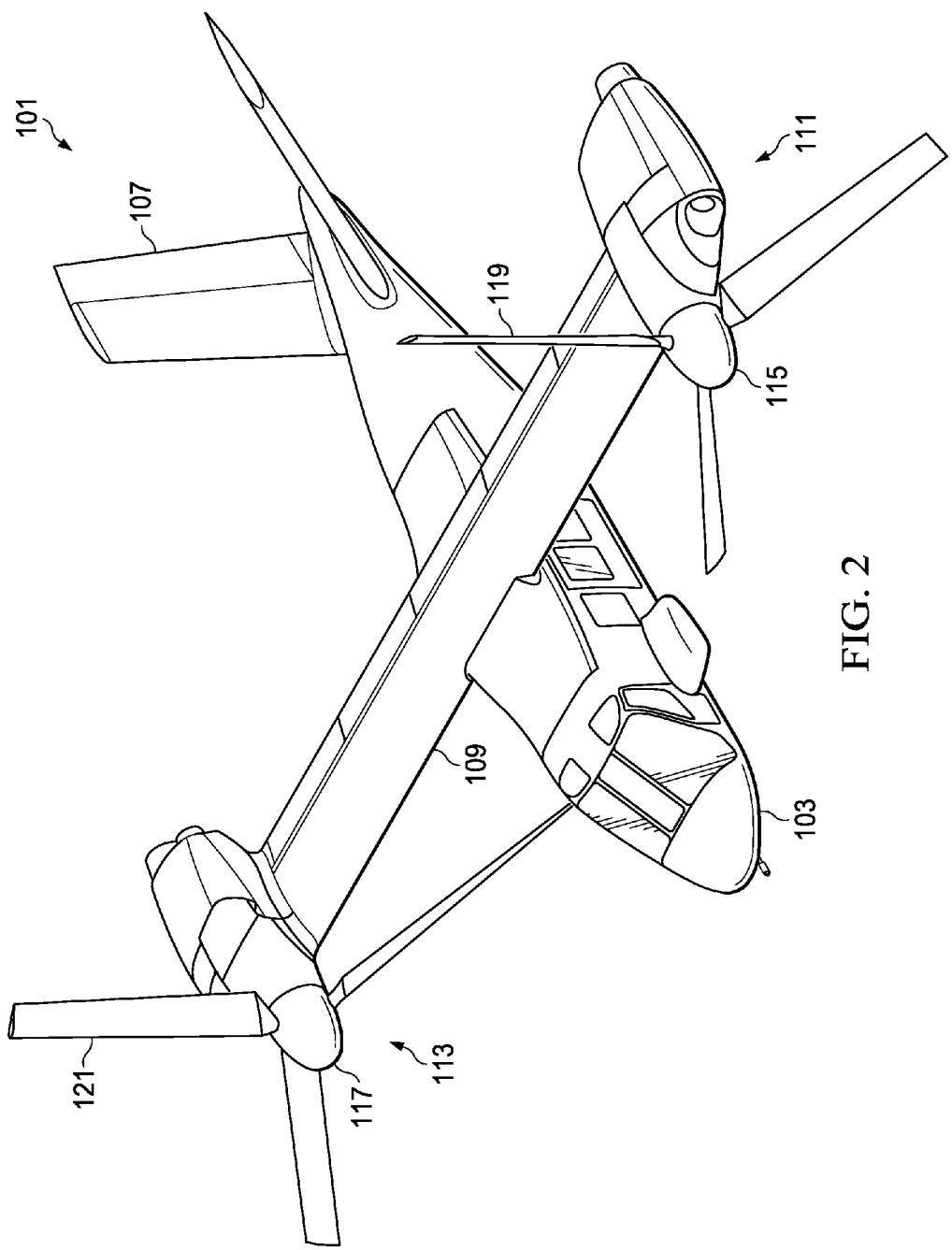
FIG. 2 is a tilt rotor aircraft in an airplane mode, according to one example embodiment.

Referring to FIGS. 1 and 2 in the drawings, a tiltrotor aircraft 101 is illustrated. Tiltrotor aircraft 101 can include a fuselage 103, a landing gear 105, a tail member 107, a wing 109, a propulsion system 111, and a propulsion system 113. Each propulsion system 111 and 113 includes a fixed engine and a rotatable proprotor 115 and 117, respectively. Each rotatable proprotor 115 and 117 have a plurality of rotor blades 119 and 121, respectively, associated therewith. The position of proprotors 115 and 117, as well as the pitch of rotor blades 119 and 121, can be selectively controlled in order to selectively control direction, thrust, and lift of tiltrotor aircraft 101.

FIG. 1 illustrates tiltrotor aircraft 101 in helicopter mode, in which proprotors 115 and 117 are positioned substantially vertical to provide a lifting thrust. FIG. 2 illustrates tiltrotor aircraft 101 in an airplane mode, in which proprotors 115 and 117 are positioned substantially horizontal to provide a forward thrust in which a lifting force is supplied by wing 109. It should be appreciated that tiltrotor aircraft can be operated such that proprotors 115 and 117 are selectively positioned between airplane mode and helicopter mode, which can be referred to as a conversion mode.

Figure 3:
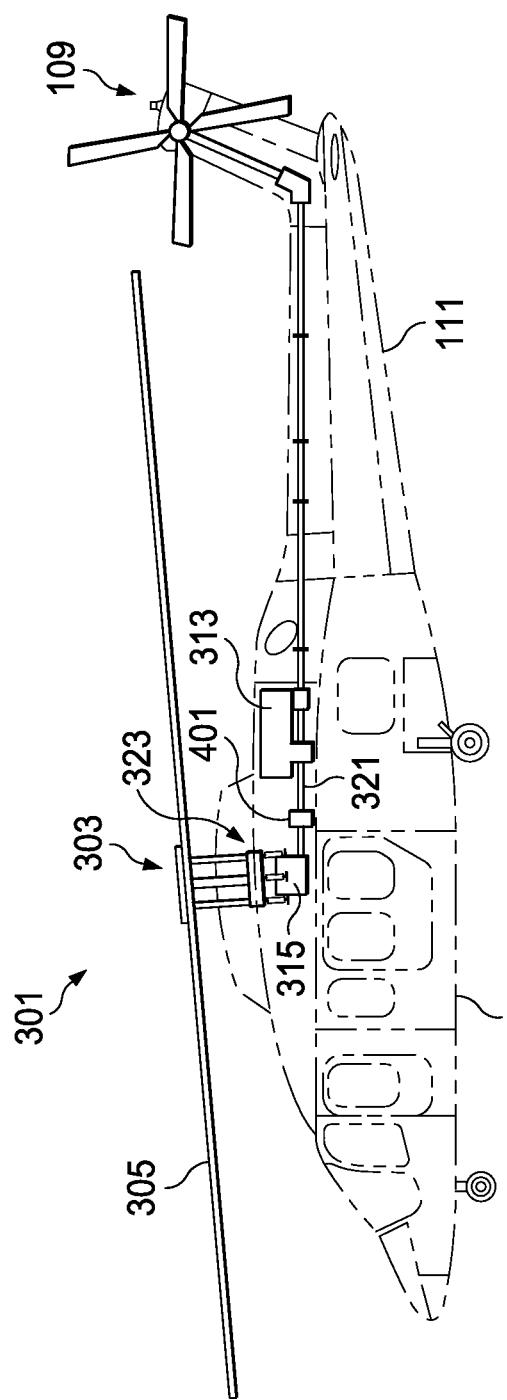
FIG. 3 is a rotorcraft, according to one example embodiment.

Referring now to FIG. 3 in the drawings, a rotorcraft 301 is illustrated. Rotorcraft 301 can include a rotor system 303 with a plurality of rotor blades 305. The pitch of each rotor blade 305 can be managed in order to selectively control direction, thrust, and lift of rotorcraft 301. For example, a swashplate mechanism 323 can be used to collectively and/or cyclically change the pitch of rotor blades 305. It should be appreciated that swashplate mechanism 323 is merely exemplary of one possible system for selectively controlling the pitch of rotor blades 305; for example, an independent blade control system is another exemplary system for selectively controlling the pitch of rotor blades 305. Rotorcraft 301 can include an airframe 307, anti-torque system 309, and an empennage 311. Torque can be supplied to rotor system 303 and anti-torque system 309 with at least one engine 313. A variable state planetary shifting mechanism 401 is operably associated within the drive system to selectively vary the rotational speed of rotor blades 305. In the illustrated embodiment, the variable state planetary shifting mechanism 401 is located between a main rotor gearbox 315 and an engine main output driveshaft 321; however, the location of the variable state planetary shifting mechanism 401 can be in other implementation specific locations, such as between main rotor gearbox 315 and the main rotor mast.

Rotorcraft 301 is merely illustrative of the wide variety of aircraft and vehicles that are particularly well suited to take advantage of the method and system of the present disclosure. It should be appreciated that other aircraft can also utilize the method and system of the present disclosure.

There is a need for a method and apparatus for slowing a main rotor using the drive system to maximize aircraft range and endurance while the engine operates at 100% design speed. An embodiment of the present disclosure is a variable state planetary shifting mechanism 103 is capable of output speed reduction ratios from 20% to 80% while the engine remains at constant speed (RPM). The reduction can be achieved by a mechanism that permits the planetary assembly to operate at 1:1 ratio for high speed operation. Low speed operation can utilize a sun gear input, ring gear output, and stationary carrier planetary configuration with a dual planetary pinion to maintain proper rotational direction at the reduced speed.

Figure 4:
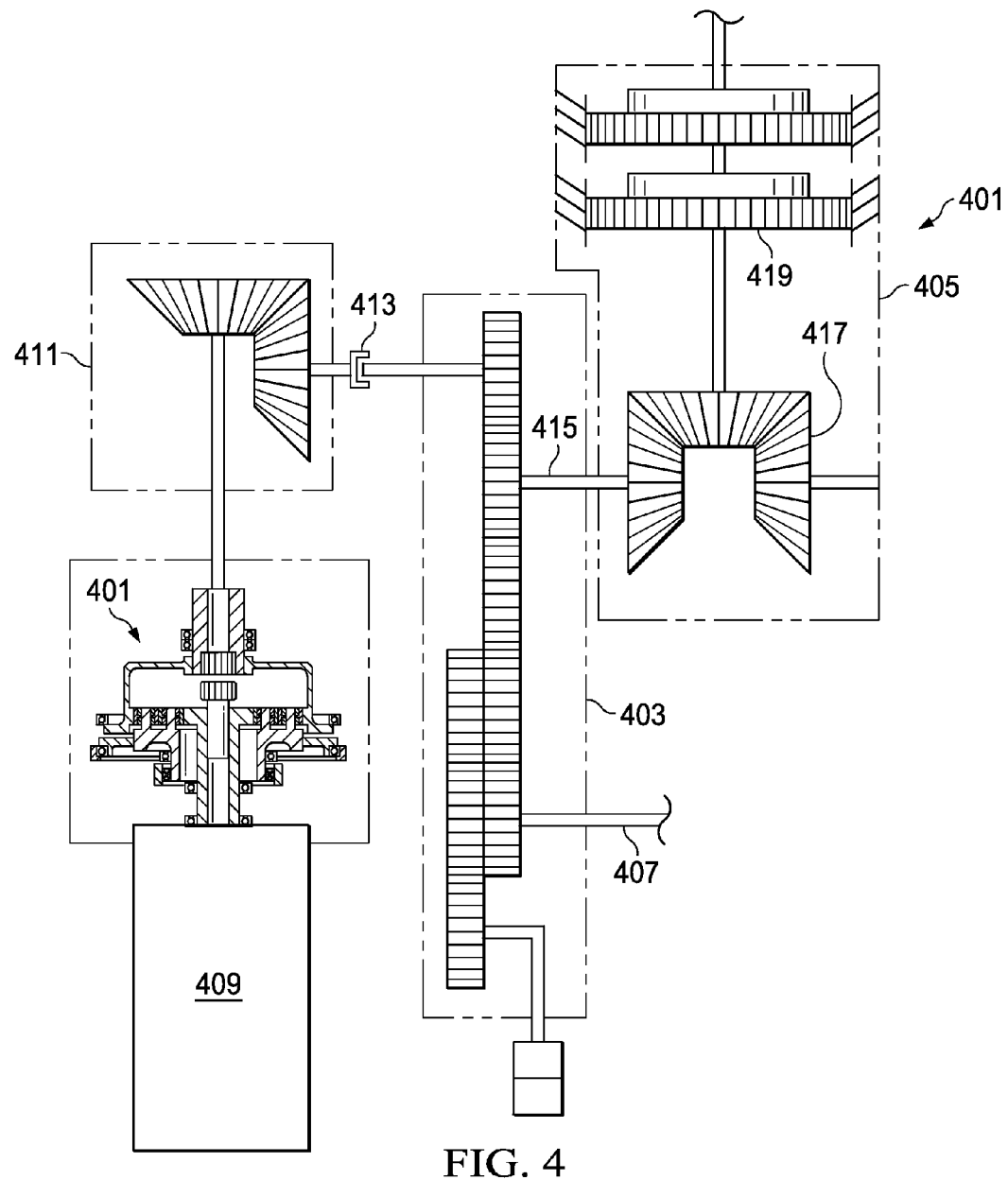
FIG. 4 is a variable state planetary shifting mechanism incorporated into a tilt rotor aircraft drive system, according to one example embodiment.

FIG. 4 provides one example embodiment a variable state planetary shifting mechanism 401 in a drive system for a tiltrotor aircraft, such as tiltrotor aircraft 101 shown in FIGS. 1 and 2. However, it should be appreciated that the variable state planetary shifting mechanism 401 can be utilized in aircraft other than tiltrotor aircraft, such as helicopters, fixed wing aircraft, unmanned aircraft, gyrocopters, and hybrid aircraft, to name a few. Further, the variable state planetary shifting mechanism 401 can also be utilized in non-aircraft implementations, such as a non-aircraft vehicles and industrial gearboxes, for example.

The components and operation of variable state planetary shifting mechanism 401 is discussed further herein. Output speed of the variable state planetary shifting mechanism 401 may be varied to achieve specific point design requirements of an aircraft and may achieve an implementation specific speed reduction, such as a speed reduction ratio of 20%-80%.

The ability to adjust rotor RPM permits various mission profiles to achieve further operational benefits that may include greater operational performance, increased range, and acoustic signature reduction. One objective of including the variable state planetary shifting mechanism 401 in the drive system is to achieve reduced rotor RPM for cruise flight conditions while the engine continues to operate at more efficient constant (high) RPM.

Still referring to FIG. 4, the illustrated tiltrotor drive system can include a fixed gearbox 403 and tilting proprotor gearbox 405 that is located the rotatable proprotor 115. The tilting proprotor gearbox 405 enables the aircraft to convert from helicopter mode to high speed cruise operation.

Accessories can be driven by accessory gears in the fixed gearbox 403. As shown in FIG. 4, power from an engine 409 is sent through variable state planetary shifting mechanism 401, then through a 90° spiral bevel gear set 411 and a subsequent over-running sprag clutch 413. Power is then diverted to the tilting proprotor gearbox 405 or to the opposite nacelle via an interconnect drive system 407 depending on the aircraft operating conditions.

As depicted in FIG. 4, engine and/or interconnect power is transmitted to the tilting proprotor gearbox through a conversion axis shaft 415. Shaft 415, along with the fixed gearbox 403 and interconnect driveshaft 407, mechanically couples the left and right rotor systems so that a single engine can operate both rotors. In certain flight conditions, drive system torque is transmitted through the interconnect driveshaft 407 from one nacelle to the other as required to manage differential rotor torque. The tilting proprotor gearbox 405 can include a 90° spiral bevel set 417 and a two-stage planetary system 419.

Figure 5:
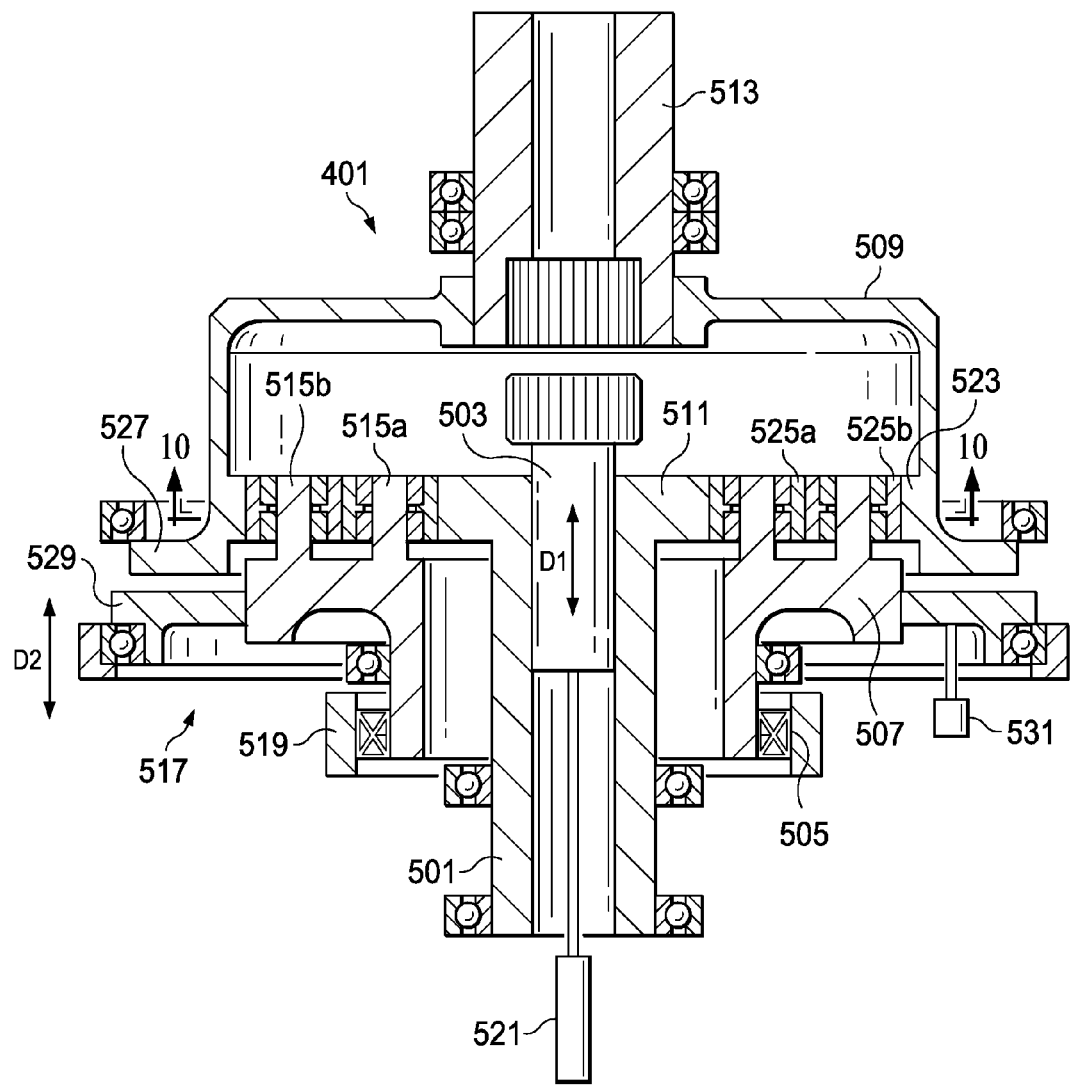
FIG. 5 is a cross-sectional view of a variable state planetary shifting mechanism, according to one example embodiment.

Referring now also to FIG. 5, variable state planetary shifting mechanism 401 can include an input shaft 501 having a sun gear 511. In FIG. 4, the input shaft 501 is illustrated in direct coupling with the engine 409; however, it should be appreciated that it is not required that input shaft 501 be directly coupled to an engine, or other power source. Rather, input shaft 501 can be connected to a variety of implementation specific power sources in a variety of implementation specific drive system arrangements. For example, variable state planetary shifting mechanism 401 can be located downstream of a gearbox such that an output shaft of the gearbox is coupled to the input shaft 501 of variable state planetary shifting mechanism 401.

Variable state planetary shifting mechanism 401 can include a lock member 503 that is splined to both the input shaft 501 and an output shaft 513. Lock member can be actuated along a direction D1 by an actuator 521 to selectively engage and disengage output shaft 513. Actuator 521 can be hydraulic, pneumatic, electric, or a mechanical linkage to an operator input, to name a few examples. Moreover, the exact type of actuator and relationship to lock member 503 is implementation specific.

Figure 10:
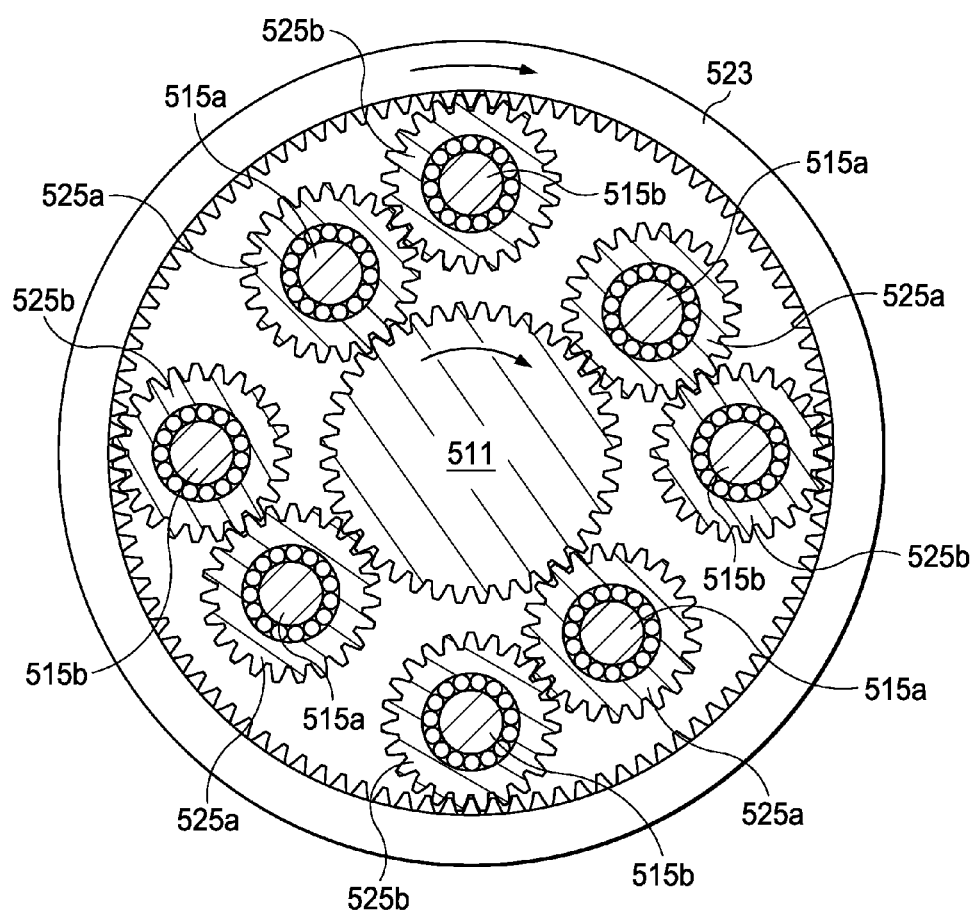
FIG. 10 is a cross-sectional view of a variable state planetary shifting mechanism, taken from section lines 10-10 in FIG. 5, according to one example embodiment.

Referring also to FIG. 10, variable state planetary shifting mechanism 401 can include a planetary carrier 507. In the example embodiment, planetary carrier 507 has an inner set of planetary pinions 515a and an outer set of planetary pinions 515b. The inner set of planetary pinions 515a support inner planetary gears 525a via bearings so that inner planetary gears 525a can rotate about the inner set of planetary pinions 515a. Similarly, the outer set of planetary pinions 515b support outer planetary gears 525b via bearings so that the outer planetary gears 525b can rotate about the outer set of planetary pinions 515b. The inner set of planetary gears 525a are in gear mesh with sun gear 511 and in gear mesh with outer planetary gears 525b. The outer planetary gears 525b are in gear mesh with the inner set of planetary gears 525a and the gear teeth of ring gear 523. One feature of the dual planetary arrangement in the example embodiment is that the input and the output rotate in the same direction.

A traditional planetary configuration may have an output rotation that is opposite the input rotation. However, it can be desirable to have both the low and high speed configurations spinning in the same rotational direction. A dual pinion configuration is utilized between the sun gear 511 and ring gear 523 to maintain rotational direction. Planetary pinions 515a and 515b act as idlers and the number of teeth on the planetary pinion gears 525a and 525b does not affect the reduction ratio. For this reason, adding an additional idler pinion does not affect the reduction ratio but only changes the rotational direction of the ring gear 523 which is acting as the output for the example embodiment.

Referring again to FIG. 5, ring gear 523 can be integral to a ring gear housing 509, the ring gear housing 509 being fixed to output shaft 513 such that ring gear housing 509 rotates with output shaft 513. Ring gear housing 509 can include a friction plate 527 for interaction with a friction clutch assembly 517. Friction clutch assembly 517 can include a friction plate 529 that can be actuated in directions D1. Friction plate 529 is coupled to planetary carrier 507 such that friction plate 529 rotates at the same speed as planetary carrier 507. Friction plate 529 can selectively engage and transfer torque to friction plate 527 of ring gear housing 509. It should be appreciated that friction plate 527 may not be integral to ring gear housing 509, rather friction plate 527 can be releasably coupled to ring gear housing 509, for example. Ground support 519 provides a stationary support for a freewheeling clutch 505.

Figure 6:
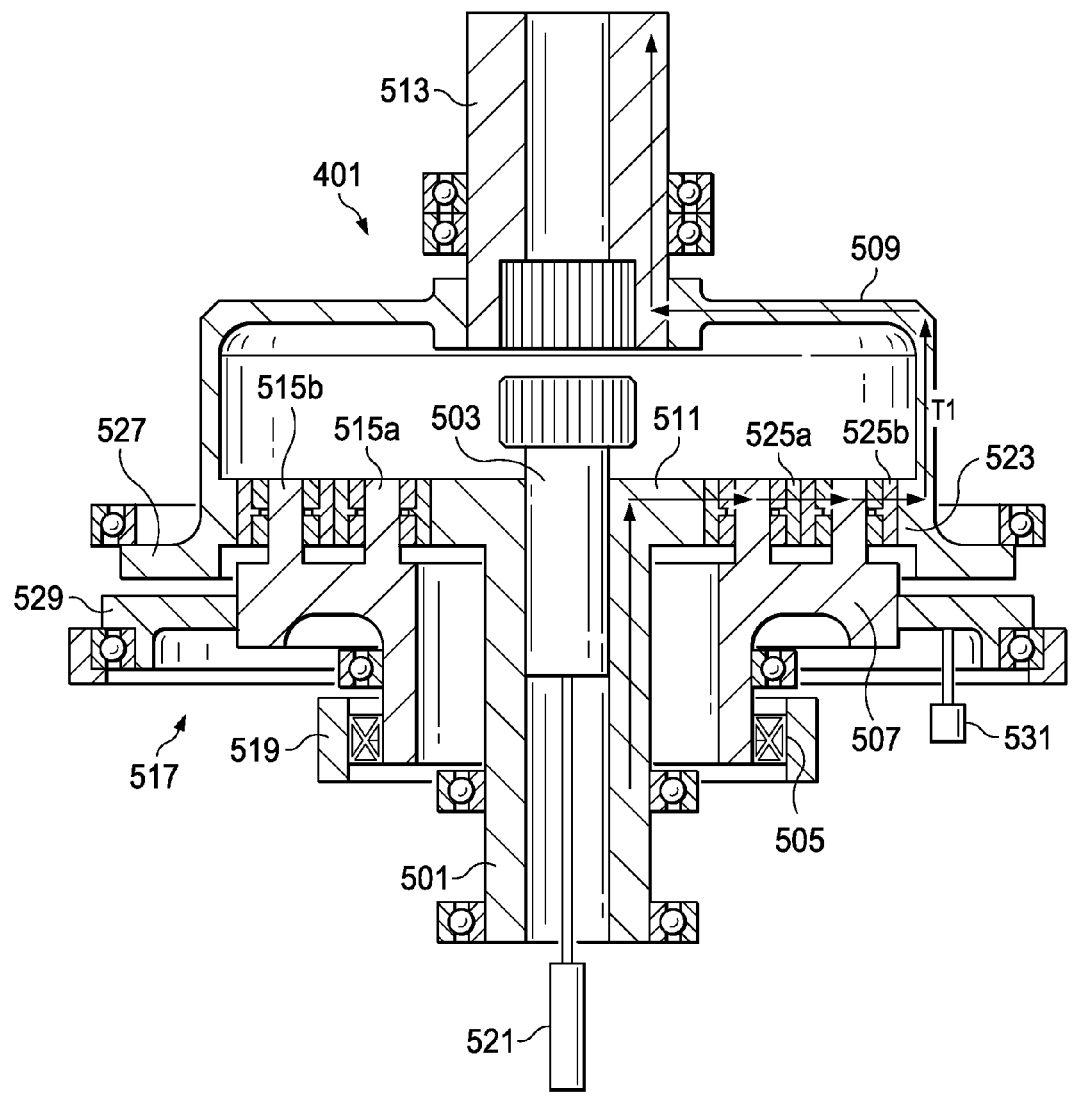
FIG. 6 is a cross-sectional view of a variable state planetary shifting mechanism in an operational state, according to one example embodiment.

Referring now also to FIGS. 6-9, the operation of variable state planetary shifting mechanism 401 is illustrated in further detail. The transition from a low speed mode to a high speed mode is disclosed herein with regard to FIGS. 6-9. FIG. 6 illustrates the variable state planetary shifting mechanism 401 in a low speed mode. In the illustrated state, the friction clutch 517 is disengaged, the freewheeling clutch 505 is engaged, and the lock member 503 is disengaged. The resulting torque path T1 is from the input shaft 501, to the sun gear 511, through the planetary pinions 515a and 515b, the planetary gears 525a and 525b, to the ring gear 525 and ring gear housing 509, and to the output shaft 513. In the illustrated state, the engine speed is 100%, the speed of the planetary carrier 507 is 0%, and the speed of the output shaft 513 is 50%. In the illustrated state, the freewheeling clutch 505 prevents the planetary carrier 507 from rotating. In the illustrated state, the torque of the engine is 50%, the torque of the output shaft 513 is 100%, the torque of the planetary carrier 507 is −50% as there is no torque transfer between the friction plates 527 and 529.

Figure 7:
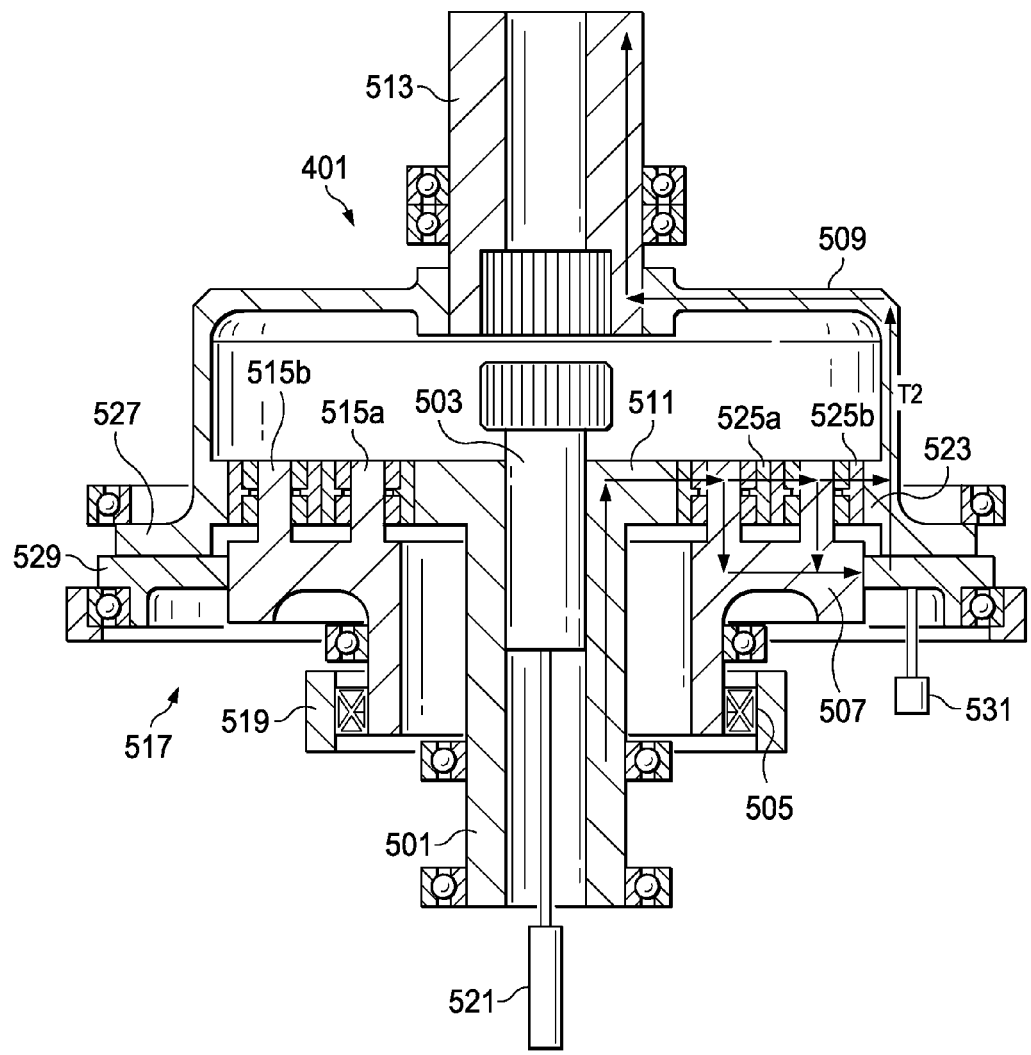
FIG. 7 is a cross-sectional view of a variable state planetary shifting mechanism in an operational state, according to one example embodiment.

FIG. 7 illustrates the variable state planetary shifting mechanism 401 in a transition state A. Transition state A represents the start of the transition of the variable state planetary shifting mechanism 401 from low speed to high speed. In transition state A, the speed of the planetary carrier 507 is 0%. In the illustrated state, the friction clutch 517 has begun engagement and friction plates 527 and 529 are slipping, the freewheeling clutch 505 is still engaged, and the lock member 503 is still disengaged. The resulting torque path T2 is from the input shaft 501, to the sun gear 511, through the planetary pinions 515a and 515b, the planetary gears 525a and 525b, to the ring gear 525 and ring gear housing 509, through the friction plates 527 and 529, and to the output shaft 513. In the illustrated state, the engine speed is 100%, the speed of the planetary carrier 507 is 0%, and the speed of the output shaft 513 is 50%. In the illustrated state, the overrunning clutch 505 prevents the planetary carrier 507 from rotating. In the illustrated state, the torque of the engine is between 50% and 100%, the torque of the output shaft 513 is between 70% and 100%, the torque of the planetary carrier 507 is between −50% and 0%. Torque transfer between the friction plates 527 and 529 is at an early stage. The torque of the engine (thus input shaft 501), can be increased to maintain output torque, unload the sprag/carrier of the freewheeling clutch 505, and to counter energy lost to clutch heat in the friction clutch 517 during engagement.

Figure 8:
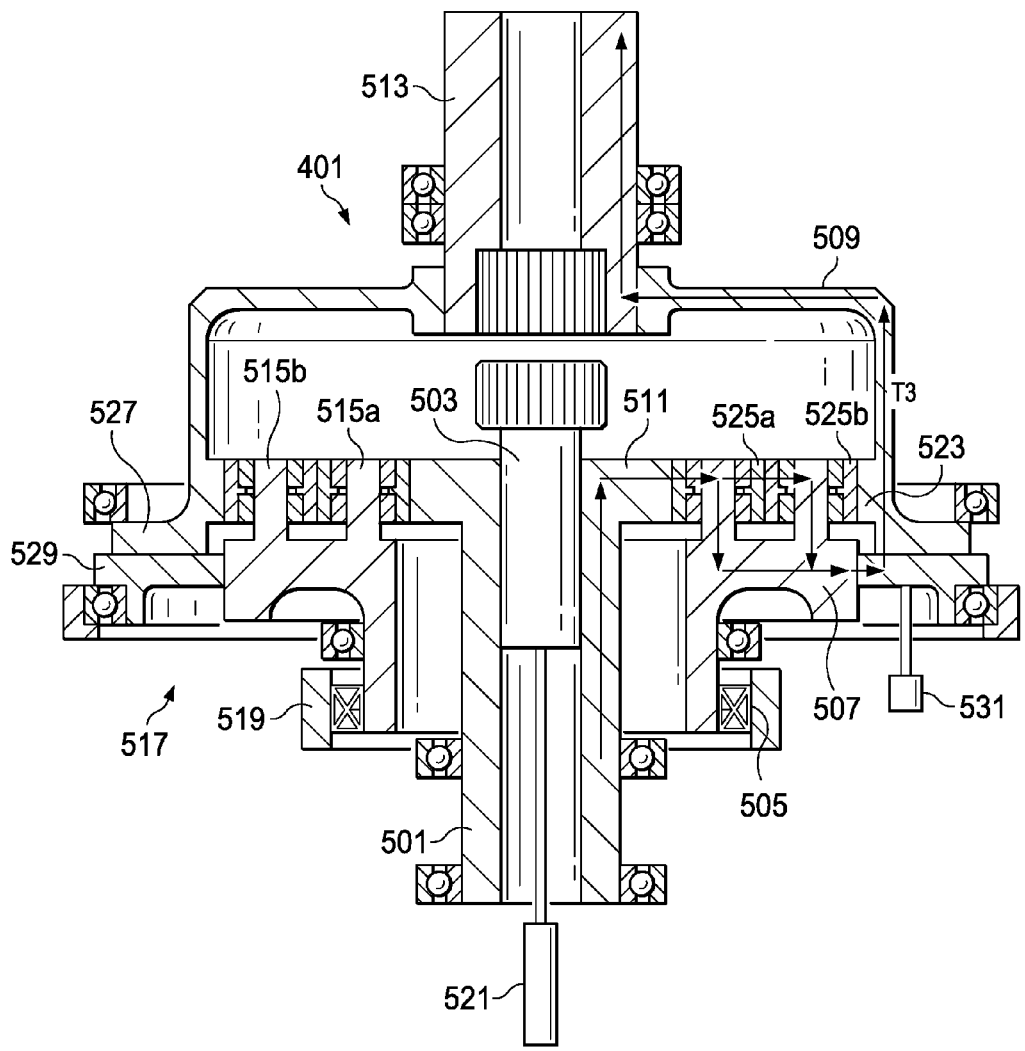
FIG. 8 is a cross-sectional view of a variable state planetary shifting mechanism in an operational state, according to one example embodiment.

FIG. 8 illustrates the variable state planetary shifting mechanism 401 in a transition state B. Transition state B is a transitory period after Transition state A as the variable state planetary shifting mechanism 401 transitions from low speed to high speed. During Transition state B, the speed of the planetary carrier 507 is between 0% and 50%. In the illustrated state, the friction clutch 517 has increased engagement and friction plates 527 and 529 are slipping, the freewheeling clutch 505 is overrunning and not engaged, and the lock member 503 is still disengaged. The resulting torque path T3 is from the input shaft 501, to the sun gear 511, through the planetary gears 525a and 525b, to the planetary pinions 515a and 515b, to the planetary carrier 507, to the friction plate 529 of the friction clutch 517, and to the friction plate 517 of the ring gear housing 509, and to the output shaft 513. In the illustrated state, the engine speed is 100%, the speed of the planetary carrier 507 is between 0% and 50%, and the speed of the output shaft 513 is 50%. In the illustrated state, the torque of the engine is between 50% and 100%, the torque of the output shaft 513 is between 70% and 100%, the torque of the planetary carrier 507 is the same as the engine torque (input torque). Torque transfer between the friction plates 527 and 529 during Transition state B is more than during transition state A. The torque of the engine (thus input shaft 501), can be modulated to maintain output torque, speed up planetary carrier 507, and to counter energy lost to clutch heat in the friction clutch 517 in slipping engagement.

Still referring to FIG. 8, the variable state planetary shifting mechanism 401 in a transition state C after transition state B. During transition state C, the speed of the planetary carrier 507 is great than 50%. In the illustrated state, the friction clutch 517 has increased engagement and friction plates 527 and 529 are not slipping, the freewheeling clutch 505 is overrunning and not engaged, and the lock member 503 is still disengaged. The resulting torque path T3 is from the input shaft 501, to the sun gear 511, through the planetary gears 525a and 525b, to the planetary pinions 515a and 515b, to the planetary carrier 507, to the friction plate 529 of the friction clutch 517, and to the friction plate 517 of the ring gear housing 509, and to the output shaft 513. In the illustrated state, the engine speed is 100%, the speed of the planetary carrier 507 is between 50% and 100%, and the speed of the output shaft 513 is between 50% and 100%. In the illustrated state, the torque of the engine is between 70% and 100%, the torque of the output shaft 513 is the same as the input torque (between 70% and 100%), the torque of the planetary carrier 507 is the same as the engine torque (between 70% and 100%). During transition state C, torque is fully transferred between the friction plates 527 and 529 since there is no slip between friction plates 527 and 529.

Still referring to FIG. 8, the variable state planetary shifting mechanism 401 can transition into a low torque high speed mode after transition state C. During the low torque high speed mode, the speed of the planetary carrier 507 is 100%. In the illustrated state, the friction clutch 517 is still not slipping, such that friction plates 527 and 529 are not slipping, the freewheeling clutch 505 is overrunning and not engaged, and the lock member 503 is still disengaged. The resulting torque path T3 is from the input shaft 501, to the sun gear 511, through the planetary gears 525a and 525b, to the planetary pinions 515a and 515b, to the planetary carrier 507, to the friction plate 529 of the friction clutch 517, and to the friction plate 517 of the ring gear housing 509, and to the output shaft 513. In the illustrated state, the engine speed is 100%, the speed of the planetary carrier 507 is 100%, and the speed of the output shaft 513 is 100%. In the illustrated state, the torque of the engine is approximately 70%, the torque of the output shaft 513 is the same as the input torque (approximately 70%), the torque of the planetary carrier 507 is the same as the engine torque (approximately 70%). During the low torque high speed mode, torque is fully transferred between the friction plates 527 and 529 since there is no slip between friction plates 527 and 529.

Still referring to FIG. 8, the variable state planetary shifting mechanism 401 can transition into a high torque high speed mode after the low torque high speed mode. During the high torque high speed mode, the speed of the planetary carrier 507 is 100%. In the illustrated state, the friction clutch 517 is still not slipping, such that friction plates 527 and 529 are not slipping, the freewheeling clutch 505 is overrunning and not engaged, and the lock member 503 is still disengaged. The resulting torque path T3 is from the input shaft 501, to the sun gear 511, through the planetary gears 525a and 525b, to the planetary pinions 515a and 515b, to the planetary carrier 507, to the friction plate 529 of the friction clutch 517, and to the friction plate 517 of the ring gear housing 509, and to the output shaft 513. In the illustrated state, the engine speed is 100%, the speed of the planetary carrier 507 is 100%, and the speed of the output shaft 513 is 100%. In the illustrated state, the torque of the engine is approximately 100%, the torque of the output shaft 513 is the same as the input torque (approximately 100%), and the torque of the planetary carrier 507 is the same as the engine torque (approximately 100%). During the high torque high speed mode, torque is fully transferred between the friction plates 527 and 529 since there is no slip between friction plates 527 and 529.

Figure 9:
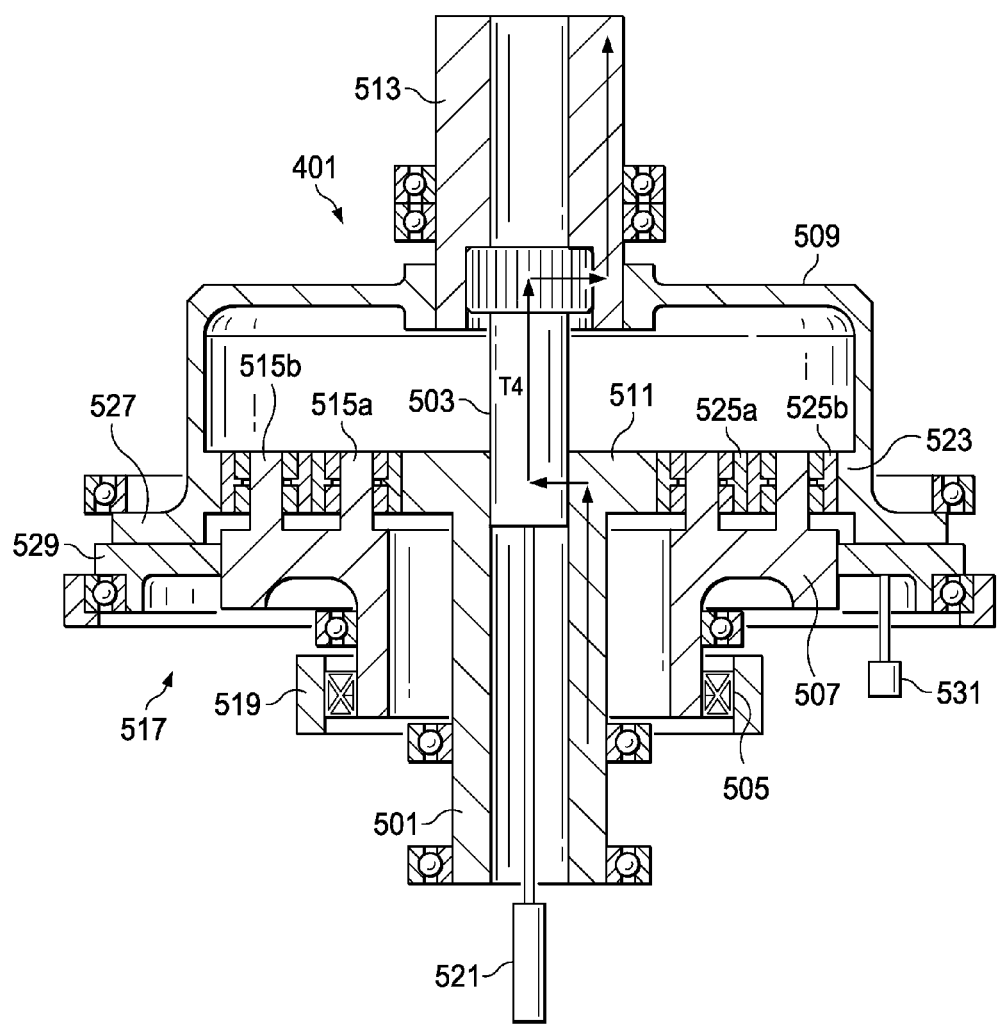
FIG. 9 is a cross-sectional view of a variable state planetary shifting mechanism in an operational state, according to one example embodiment.

Referring now to FIG. 9, the variable state planetary shifting mechanism 401 can transition into another version of the high torque high speed mode in which the lock member 503 is actuated to be in splined engagement with the output shaft 513. The resulting torque path T4 is from the input shaft 501, to the lock member 503, to the output shaft 513. The friction clutch assembly 517 can either be engaged or disengaged. In the illustrated state, the engine speed is 100%, the speed of the planetary carrier 507 is 100%, and the speed of the output shaft 513 is 100%. In the illustrated state, the torque of the engine is approximately 100%, the torque of the output shaft 513 is the same as the input torque (approximately 100%), and the torque of the planetary carrier 507 is the same as the engine torque (approximately 100%).

The variable state planetary shifting mechanism 401 is a single stage planetary configuration in which the sun gear 511 is the input and the ring gear 523 is the output. The two ratios (high speed and low speed) are achieved using the single stage planetary by either locking or freeing the planetary carrier 507 via the freewheeling clutch 505. In high speed operation (shown in FIGS. 8 and 9), the planetary components do not have independent degrees of freedom and therefore rotate as a unit. There is no reduction ratio in this configuration; the ring gear (output) 523 rotates at the same rotational speed as the sun gear (input) 511 and therefore, the ratio is 1:1.

During transition (illustrated in FIGS. 7 and 8), power is transmitted through the planetary carrier 507, through the friction clutch 517 and into the ring gear 523. When the speed stabilizes in low speed operation, power is transmitted across the pinions 515a and 515b on a stationary carrier and into the ring gear 523. Any sliding in the friction clutch is transitory and lasts only while establishing the different torque path.

Regarding a low speed output, such as a 2:1 reduction; i.e. the output shaft 513 spins at half the speed of the input shaft 501, the number of gear teeth of ring gear 523 is twice that of the sun gear 511. However, the option exists to vary the reduction ratio much more dramatically than a 2:1 ratio, which is provided as an example embodiment. Aircraft point design may desire a ratio that lends itself to a different planetary configuration for which an implement specific embodiment can accommodate.

Figure 11:
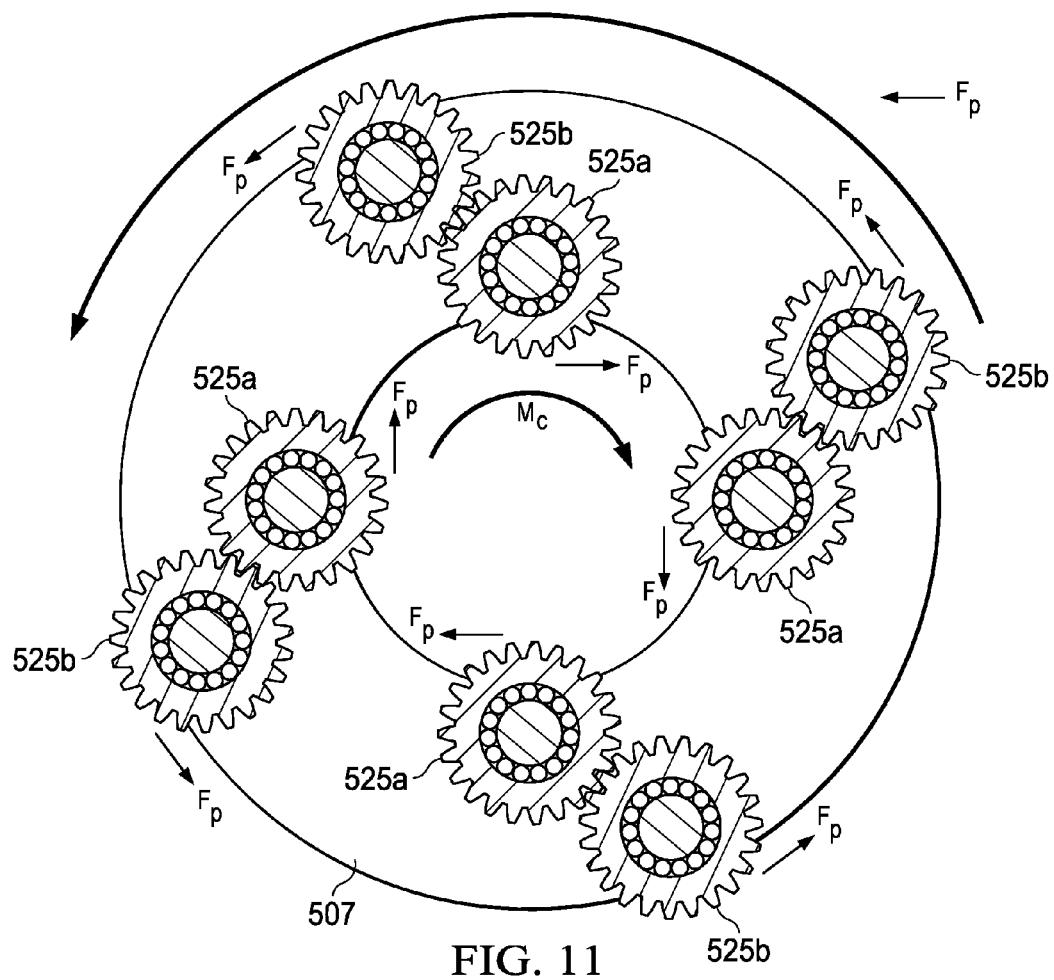
FIG. 11 is a stylized force diagram of a variable state planetary shifting mechanism, according to one example embodiment.

FIG. 11 graphically illustrates the resultant forces of the planetary carrier 507 as it operates in low speed configuration. The resultant force on the planetary carrier 507 is in a rotational direction opposite the sun gear 511. While operating in high speed configuration, the rotation of the planetary carrier 507 is in the same direction as the sun gear 511. This geometry allows one to limit rotation of the planetary carrier 507 while in low speed configuration with the one way freewheeling unit 505 that allows free rotation in one direction and restricts rotation in the opposite direction. In FIG. 11, Mc is the resultant moment on the planetary carrier 507 by the freewheeling clutch 505 and Fp is the force on the teeth of the pinion gears 525a and 525b. The sun gear 511 and the ring gear 523 are not shown in FIG. 11 for clarity.

Referring again to FIGS. 6-9, the variable state planetary shifting mechanism 401 can utilize RPM modulation between the planetary carrier 507 and the ring gear 523 to shift between high and low speed operation. Regarding operation of variable state planetary shifting mechanism 401 in low speed, the planetary carrier 507 is free to rotate relative to the ring gear 523 and a reduced output RPM is achieved. For high (1:1) RPM, the friction clutch 517 is engaged to force the ring gear 523 to match the RPM of the planetary carrier 507. In an effort to minimize relative rotational speeds between the two components to be locked out, the embodiment can clutch the ring gear 523 to the planetary carrier 507 for high speed configuration. Shifting between the high and low speed configurations can be achieved by modulating the pressure applied to the friction clutch 517 and allowing temporary slippage of the friction clutch 517 as the planetary components, the downstream drive system components, and the rotor system changes speed to the other configuration. Shifting from high to low speed configuration, the ring gear 511 and planetary carrier 507 start at the same rotational speed equal to the speed of input 501. Therefore, the friction clutch 517 starts in a fully engaged state and releases pressure in a controlled manner. The rotor and drive system rotational speed naturally decay as the relative velocity of the friction clutch 517 increases until such point that the planetary carrier 507 is stationary and locked against the one way freewheeling clutch 505. Once the planetary carrier 507 is stationary, the friction clutch 517 can be fully disengaged and low speed operation fully established.

Regarding a transition from low to high speed configuration, the ring gear 523 and planetary carrier 507 begin with their maximum relative rotational velocities. As pressure is applied to the friction clutch 517, the variable state planetary shifting mechanism components, the downstream drive system components, and the rotor system accelerate until such time that the planetary is clutched together and high speed operation has been fully established. However, two conditions may exist in this configuration which may be undesirable: 1) the sliding friction clutch is holding flight torque while in high speed operation and 2) torque is transmitted through the planetary components which are stationary relative to themselves. For these reasons, the lock member 503 feature is provided to lock the sun gear 511 to the ring gear 523 when high speed operation is established. The lock member 503 allows the pressure to be relieved from the friction clutch 517 and direct torque transmission directly from the input shaft 501 to the output shaft 513. Such an arrangement can prevent the planetary teeth from carrying load in a static condition. Positive confirmation of mechanical lock between lock member 503 and output shaft 513 may be utilized via a positional sensor before pressure is allowed to be relieved from the friction clutch assembly 517.

The addition of the mechanical lock member 503 may require a shift sequence more complicated than simply modulating the pressure of the friction clutch 517. In order to shift from high to low speed operation, the shift sequence can be as follows: First engage the friction clutch 517. Note that the ring gear 523 and the planetary carrier 507 are spinning at the same rotational speed while in high speed operation. Next, disengage the mechanical lock member 503 between the sun gear 511 and the ring gear 523. Removal of the lock member 503 can allow relative rotational motion between the ring gear 523 and sun gear 511. Next, gradually release pressure of the friction clutch 517 to allow deceleration of the system as described above. Next, achieve low speed configuration and fully disengage the pressure of friction clutch 517.

Shifting from low speed to high speed configuration is the reverse of the high speed to low speed shift sequence. Once the friction clutch 517 has achieved rotational lockup, the mechanical lock member 503 is engaged and the pressure on the friction clutch 517 is released.

Torque can be transmitted by the friction clutch 517 during slippage is proportional to the pressure of the friction clutch 517. There may be multiple variables which make consistent application of the friction clutch 517 from one shift to another not exactly the same, three examples are: 1) the coefficient of dynamic friction may not remain constant throughout the shift sequence; 2) as both the left hand and the right hand side of the tiltrotor aircraft are shifted at the same time; the interconnect drive shaft may transfer transients from one shifter to the other; and 3) the torque demand may not be constant as the rotor speed varies. As a result, the variable state planetary shifting mechanism 401 may require modulation of the applied pressure of the friction clutch 517 via control logic to account for the varying parameters of the shift to ensure smooth and consistent shifting characteristics.

A closed loop control logic can modulate pressure associated with an actuator 531 (schematically shown in FIG. 5) of friction clutch 517 to achieve shift in a shift duration predetermined and programmed into the control logic. The exact shift duration of the friction clutch 517 is implementation specific.

It can be desirable for the shifting procedure to transition between high speed and low speed operation within a certain time duration, such as within 20 seconds. It should be appreciated that the total duration shift period can vary depending on air speed. The variable state planetary shifting mechanism 401 can shift while maintaining constant engine speed.

The air vehicle altitude and forward velocity can be maintained during the shift sequence because the variable state planetary shifting mechanism 401 maintains continuous but not constant torque transfer to the rotors. As the rotor speed is reduced to 50%, the torque required to maintain forward velocity may increase despite the improved rotor efficiency. The optimum balance between torque ratings and maximum forward velocity is specific to each implementation and placement of the variable state planetary shifting mechanism 401.

One advantage of the variable state planetary shifting mechanism 401 is the flexibility to be implemented on a variety of applications and platforms. Clutching technology can be applied to achieve multiple benefits including but not limited to; acoustic signature, performance, etc., in tail and main rotor drive systems as well as tiltrotor platforms.

The particular embodiments disclosed herein are illustrative only, as the apparatus may be modified and practiced in different but equivalent manners apparent to those skilled in the art having the benefit of the teachings herein. Modifications, additions, or omissions may be made to the apparatus described herein without departing from the scope of the invention. The components of the apparatus may be integrated or separated. Moreover, the operations of the apparatus may be performed by more, fewer, or other components.

Furthermore, no limitations are intended to the details of construction or design herein shown, other than as described in the claims below. It is therefore evident that the particular embodiments disclosed above may be altered or modified and all such variations are considered within the scope and spirit of the disclosure.

To aid the Patent Office, and any readers of any patent issued on this application in interpreting the claims appended hereto, applicants wish to note that they do not intend any of the appended claims to invoke paragraph 6 of 35 U.S.C. § 112 as it exists on the date of filing hereof unless the words "means for" or "step for" are explicitly used in the particular claim.

The invention claimed is:

1. A variable state planetary shifting transmission comprising:
   an input shaft;
   an output shaft;
   a planetary system comprising:
     a sun gear associated with the input shaft;
     a planetary carrier; and
     a ring gear associated with a ring housing;
   an overrunning clutch operably coupled to the planetary carrier;
   a clutch assembly coupled to the planetary carrier, wherein the clutch assembly includes a first friction plate operable with a second friction plate, the second friction plate being coupled to the ring gear housing; and
   a clutch actuator operable to selectively translate the first friction plate against the second friction plate.

2. The variable state planetary shifting transmission according to claim 1, wherein the ring housing is coupled to the output shaft.

3. The variable state planetary shifting transmission according to claim 1, wherein the overrunning clutch is configured to prevent the planetary carrier from rotating about a first direction of rotation.

4. The variable state planetary shifting transmission according to claim 1, wherein the planetary carrier has a planetary pinion and a planetary gear.

5. The variable state planetary shifting transmission according to claim 1, wherein the planetary carrier has an inner set of planetary pinions and an outer set of planetary pinions.

6. A variable state planetary shifting transmission comprising:
   an input shaft;
   an output shaft;
   a planetary system comprising:
     a sun gear associated with the input shaft;
     a planetary carrier;
     a ring gear associated with a ring housing;
   an overrunning clutch operably coupled to the planetary carrier;
   a clutch assembly coupled to the planetary carrier; and
   a lock member in splined connection with the input shaft, the lock member being operable to selectively engage the output shaft.

7. The variable state planetary shifting transmission according to claim 6, further comprising:
   a lock member actuator operable to translate the lock member.

8. An aircraft, comprising:
a fuselage;
an engine;
a rotor hub having a plurality of rotor blades;
a variable state planetary shifting transmission comprising:
  an input shaft;
  an output shaft;
  a sun gear associated with the input shaft;
  a planetary carrier; and
  a ring gear associated with a ring housing;
an overrunning clutch operably coupled to the planetary carrier;
a clutch assembly coupled to the planetary carrier, wherein the clutch assembly includes a first friction plate operable with a second friction plate, the second friction plate being coupled to the ring gear housing; and
a clutch actuator operable to selectively translate the first friction plate against the second friction plate.

9. The aircraft according to claim 8, further comprising:
a lock member in splined connection with the input shaft, the lock member being operable to selectively engage the output shaft.

10. The aircraft according to claim 9, further comprising:
a lock member actuator operable to translate the lock member.

11. The aircraft according to claim 8, wherein the ring housing is coupled to the output shaft.

12. The aircraft according to claim 8, wherein the overrunning clutch is configured to prevent the planetary carrier from rotating about a first direction of rotation.

13. The aircraft according to claim 8, wherein the planetary carrier has a planetary pinion and a planetary gear.

14. A method of changing a rotor speed in an aircraft, the method comprising:
powering an input shaft with an engine, the input shaft having a sun gear in gear mesh with a plurality of planetary gears supported by a planetary carrier;
actuating a friction clutch to engage a ring gear, the friction clutch being in fixed rotation with the planetary carrier, wherein the friction clutch includes a first friction plate operable with a second friction plate, the second friction plate being coupled to the ring gear housing, and wherein the actuating the friction clutch comprises operating a clutch actuator to selectively translate the first friction plate against the second friction plate; and
freeing an overrunning clutch that is associated with the planetary carrier so that the planetary carrier is free to rotate.

15. The method according to claim 14, further comprising:
actuating a lock member to provide a torque path between the input shaft and an output shaft, the output shaft being in power communication with a rotor mast of the aircraft.

16. The method according to claim 14, wherein the ring gear is associated with a ring housing that is coupled to an output shaft, the output shaft being in power communication with a rotor mast of the aircraft.

* * * * *